Sept. 7, 1926.
T. BROWN ET AL
PLOW
Original Filed May 19, 1919
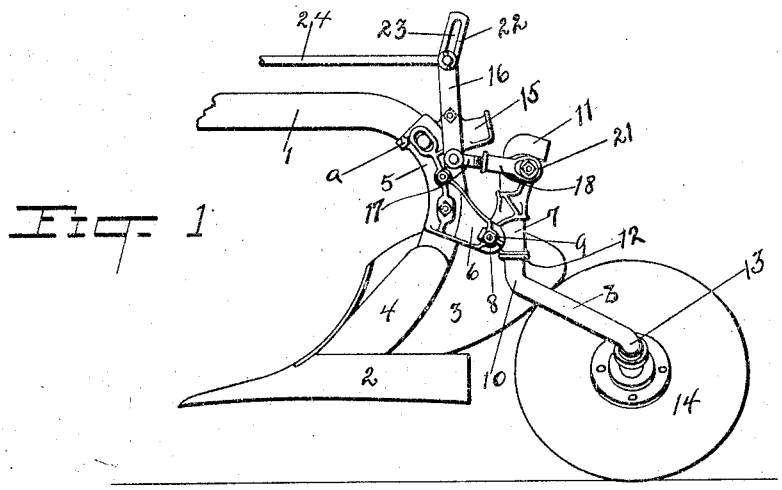
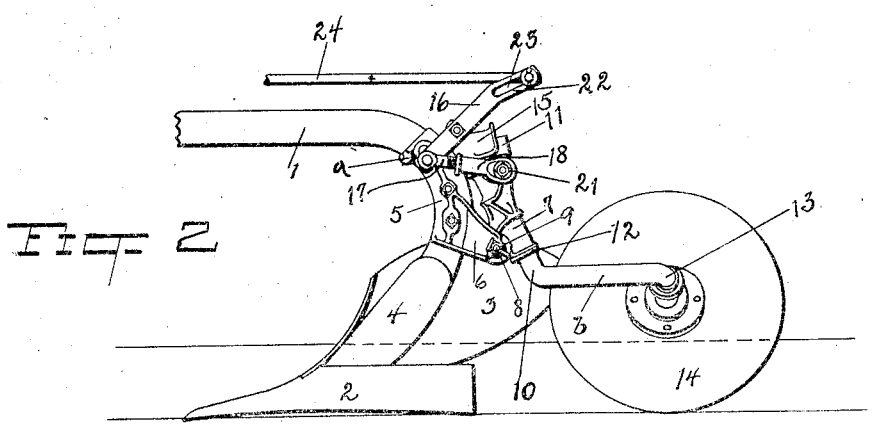
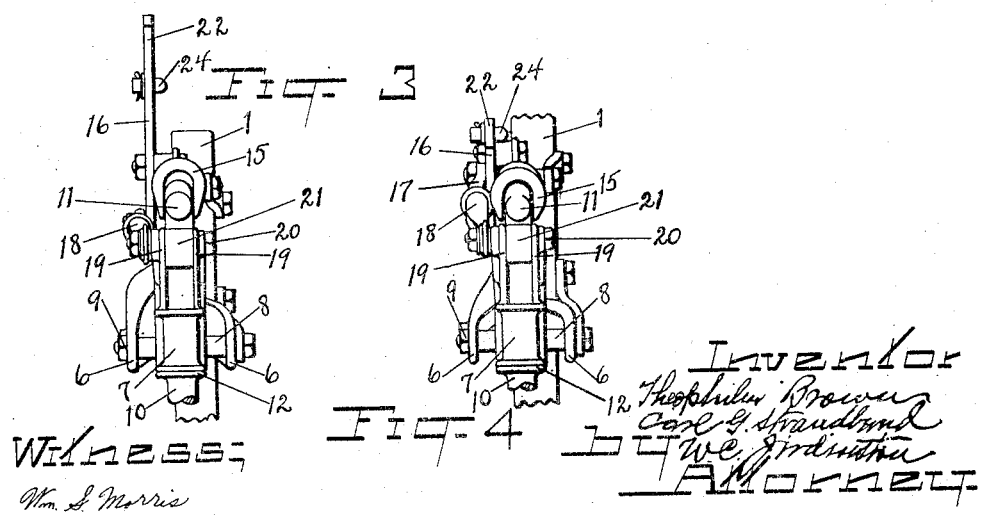

Patented Sept. 7, 1926.

1,598,803

UNITED STATES PATENT OFFICE.

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS.

PLOW.

Application filed May 19, 1919, Serial No. 298,224. Renewed June 29, 1922. Serial No. 571,764.

Our invention relates to plows and more particularly to wheeled plows having a rear supporting wheel, and the object of our invention is to provide an effective and economical means of operating said wheel to raise the rear of the plow and permit the wheel to caster, and to lock the wheel in a following position when the plow is in operation.

Referring to the drawings in which similar numerals indicate identical parts.

Figure 1 is a side elevation of a plow in raised position with our improvement thereon and the wheel free to caster.

Figure 2 is a similar view with the plow down in working position and the wheel locked in position to follow the furrow.

Figure 3 is a rear view in part of Figure 1, and

Figure 4 is a rear view in part of Figure 2.

Our device is shown mounted on the rear of a plow beam 1, and while normally it is applied to a tractor drawn gang plow and is operated by the mechanism employed to raise the forward end of the plow, as well known in the art, it may be operated by means of a hand lever mounted on the plow. A plow body is mounted on the beam 1, and comprises a share 2, moldboard 3, and frog 4. Above the plow body is secured on the beam 1, in any suitable manner, a bracket 5 having rearwardly extending arms 6. Between the arms 6 is mounted a sleeve 7 which is adapted to rock on a bolt 8 which passes through the ends of the arms 6 and the lower position of the sleeve 7 and is secured in place preferably by a nut 9.

A crank axle, bent at an obtuse angle, has an upright portion 10 journaled to rotate in the sleeve 7, the upper end of the portion 10 being bent rearwardly for a purpose hereinafter described. Below the sleeve 7 is a flange or collar 12, preferably integral with the portion 10, against which the sleeve 7 bears. From a point a short distance below the flange 12 the portion $b$ of the crank axle extends rearwardly and terminates in a spindle 13, extending laterally and downwardly in a furrowward direction, on which a wheel 14 is journaled.

Preferably integral with the upper end portion of the bracket 5 is a hood 15 extending rearwardly and open at the rear and underside for reception of the upper end 11 of the crank axle. Pivotally mounted intermediate its ends on the hood 15 is a lever 16 to the lower end of which is pivotally secured a link composed of parts 17 and 18, the part 18 being in the form of a sleeve having its rearward end pivotally secured to rearwardly extending arms 19, preferably integral with the sleeve 7, by means of a bolt 20 which passes through both of said arms and a washer 21 therebetween. The forward end of the sleeve 18 is tapped for the reception of the part 17, so that the link can be lengthened or shortened, by removing a nut on the end of the bolt 20, the sleeve 18 can be readily removed from the bolt and turned until the link is adjusted to the desired length, the limit of play of the lever 16 when the plow is lowered being controlled by a stop $a$ on the bracket 5.

The upper end portion 22 of the lever 16 is bent rearwardly at a slight angle and is provided wth a slot 23 to receive the hooked end of a rod 24 which extends forwardly to the mechanism employed to raise the forward part of the plow and is arranged to be moved longitudinally in a forward direction when said mechanism is actuated to lift the plow, and to be moved in a rearward direction when said mechanism is actuated to lower the plow. It will be noted that, as shown in Fig. 2, when the plow is in its working position the lever 16 is inclined rearwardly and the slot 23 then assumes an approximately horizontal position, whereas when the plow is in its raised position, as shown in Fig. 1, the lever 16 is then substantially vertical and the slot 23 is approximately vertical also, but inclines slightly to the rear. By this construction a lost motion connection is provided between the rod 24 and the lever 16 that is effective when the plow is in its working position, since at that time the slot 23, as above stated, is approximately horizontal, but when the plow is in its raised position, as said slot is then approximately vertical, or at right angles to the line of movement of the rod 24, the lost motion connection becomes ineffective to permit longitudinal movement of said rod independently of the lever 16. At that time, therefore, the rod 24 serves to hold the lever 16 against rocking in either direction, and therefore holds the sleeve 7 in a fixed position. The purpose of giving the slot 23 a slight rearward inclination when the plow is lifted is to prevent the bent end of the rod 24 from running up to the top of the slot, which would have the effect of lowering the plow slightly. When the plow is in its working position the lost motion connection permits the plow in breaking out of the ground to rise at its forward part for a limited height without actuating the mechanism which raises the rear part of the plow, and also enables the bent end of the rod 24 to play back and forth in the slot 23 as the landwheel of the plow is adjusted upwardly or downwardly to vary or regulate the depth of plowing, so that depth adjustment may be made without disturbing the position of the wheel 14 with respect to the bottom of the plow body. When the plow is lowered from its inoperative position, shown in Fig. 1, the rod 24 moves rearwardly, moving the upper end of the lever 16 in the same direction, and the weight of the plow as it descends operates to rock the sleeve 7 and the crank axle about the pivot 8, the upper end of said sleeve and crank axle swinging toward the beam 1 until the plow is down and the upper end 11 of the crank axle enters the hood 15.

It will be clearly seen that when the plow is down, and the end 11 of the crank axle is held within the hood, the crank axle is locked in position, as shown in Figure 2, and held securely against castering. In raising the plow, however, power being transmitted to the lever 16 through the rod 24, when said rod reaches the forward end of the slot 23, said lever is rocked forwardly by the pull of the rod 24, and through the link 17 and sleeve 18 connecting the lever to the sleeve 7, the latter is rocked rearwardly, or in a clockwise direction as viewed in Fig. 1, withdrawing the end 11 of the crank axle from the hood 15 and moving the wheel 14 toward the plow, thereby raising the plow from the ground, as shown in Figure 1, and as the end 11 of the crank axle is withdrawn from the hood 15, the crank axle is free to turn in the sleeve 7 so that the wheel 14 will readily caster. When the plow is raised as shown, it frequently occurs that, when it is desired to lower the plow, the wheel 14 is at an angle to the proposed line of advance and the crank axle has been turned until the part 11 is at an angle to the hood 15, and we find that, because of the obtuse angle bend of the crank axle, the weight of the plow causes a more rapid movement of the axle to bring the wheel 14 into line with the operation of the plow, this movement being assisted by the sides of the hood 15 as the part 11 reaches contact therewith, it being presumed that the plow is in motion.

Our device is simple and economical in construction and practical in operation, automatically locking the crank axle, when the plow is in operation, to hold the wheel 14 firmly in alinement with the advance of the plow, and when the plow is raised the crank axle is automatically released to permit the wheel 14 to caster freely.

What we claim is—

1. In a wheeled plow, the combination of a bracket on the rear of the plow, a sleeve pivotally supported on the bracket to rock forwardly and rearwardly, a crank axle having an upright spindle journaled to rotate in said sleeve, a hood on the rear of the plug, a wheel on the crank axle, means on the plow actuable to rock said sleeve and spindle to raise or lower the plow, and means on the upper end of the spindle to engage with said hood to lock the spindle against rotation when the plow is down.

2. In a wheeled plow, the combination of a bracket on the rear of the plow, a sleeve pivotally supported on the bracket to rock forwardly and rearwardly, a crank axle having an upright spindle journaled to rotate in said sleeve, a hood on the rear of the plow, a wheel on the crank axle, means on the plow actuable to rock said sleeve and spindle to raise or lower the plow, and means on the upper end of the spindle to engage with said hood to rotate the spindle as the plow is lowered and to lock the spindle against rotation when the plow is down.

3. In a wheeled plow, the combination of a bracket on the rear of the plow, a sleeve pivotally supported on the bracket to rock forwardly and rearwardly, a crank axle having an upright spindle journaled to rotate in said sleeve, a hood on the rear of the plow, a wheel on the crank axle, means on the plow actuable to rock said sleeve and spindle to raise or lower the plow, and means on the upper end of the spindle to engage with said hood to rotate the spindle by weight of the plow as the latter is lowered and to lock the spindle against rotation when the plow is down.

4. In a wheeled plow, the combination of a bracket on the rear of the plow, a sleeve pivotally supported on the bracket to rock forwardly and rearwardly, a crank axle having an upright spindle journaled to rotate in said sleeve, a hood on the rear of the plow, a wheel on the crank axle, means on the plow actuable to rock said sleeve and spindle to raise or lower the plow, and a rearward extension on the upper end of the spindle adapted to engage with the hood to lock the spindle against rotation when the plow is down.

5. In a wheeled plow, the combination of a bracket on the rear of the plow, a sleeve pivotally supported adjacent its lower end on the bracket to rock forwardly and rearwardly, a crank axle having an upright spindle journaled to rotate in said sleeve, a wheel on the crank axle, a lever pivoted intermediate its ends on the plow and connected to said sleeve and actuable to rock said sleeve and spindle to raise and lower the plow, an extension on the upper end of said crank axle at an angle to the spindle, and a hood on the plow to receive said extension to lock said spindle against rotation when the plow is down.

6. In a wheeled plow, the combination of a bracket on the rear of the plow, a sleeve pivotally supported on the bracket to rock fore and aft to raise or lower the plow, a crank axle having an upright spindle journaled to rotate in said sleeve, a wheel on the crank axle, means on the plow actuable to rock said sleeve and spindle to raise or lower the plow, means for locking the spindle against rotation when the plow is down and a stop on the plow operating to limit the lowering movement of said sleeve.

7. In a wheeled plow, the combination of a bracket on the rear of the plow, a sleeve pivotally supported on the bracket to rock fore and aft to raise or lower the plow, a crank axle having an upright spindle journaled to rotate in said sleeve, a wheel on the crank axle, means on the plow actuable to rock said sleeve and spindle to raise or lower the plow, means for rocking the spindle against rotation when the plow is down, a stop on said plow operating to limit the lowering movement of said sleeve and means for varying the extent to which said sleeve may so rock.

8. In a wheeled plow in combination with the plow beam, a sleeve pivotally supported by said beam to rock fore and aft, an axle journaled in said sleeve, a rear furrow wheel mounted on said axle and movable fore and aft by the rocking of said sleeve, a lever fulcrumed on said beam, an adjustable connection between said lever and said sleeve whereby said sleeve may be rocked by actuation of said lever, a stop for limiting the movement of said lever in one direction and an operating rod for said lever arranged for limit movement independently thereof.

9. In a wheeled plow having means to raise or lower the front of the plow, mechanism for raising or lowering the rear of the plow comprising a lever having a slot in its upper part arranged to extend approximately horizontally when the plow is in working position and to assume an approximately vertical position when the plow is raised, and a rod connected to the means for raising the front of the plow and loosely engaging with said slot.

10. In a wheeled plow having means to raise or lower the front of the plow, mechanism for raising or lowering the rear of the plow comprising a lever, means actuated by movement of said lever in one direction to lift the rear of the plow, and an operating connection, between the means for raising the front of the plow and said lever, comprising means controlled by the movement of said lever to provide a lost motion connection with said lever when the plow is in working position, and a connection operating to hold said lever against rocking in either direction when the plow is in its raised position.

11. In a wheeled plow having means to raise or lower the front of the plow, mechanism for raising or lowering the rear of the plow comprising a lever, means actuated by movement of said lever in one direction to lift the rear of the plow, and a rod connecting said lever with the means for raising the front of the plow, said rod and said lever having a connection controlled by the movement of said lever to permit said rod to move longitudinally independently of said lever to a limited extent when the plow is in its working position, and to hold said rod against longitudinal movement independently of said lever when the plow is in its raised position.

THEOPHILUS BROWN.
CARL G. STRANDLUND.